United States Patent Office 2,954,346

Patented Sept. 27, 1960

2,954,346

PERMANENT MAGNETIC MATERIALS

Merrill W. Shafer, Poughkeepsie, N.Y., assignor to International Business Machines Corporation, New York, N.Y., a corporation of New York No Drawing. Filed Oct. 28, 1959, Ser. No. 849,178

8 Claims. (Cl. 252—62.5)

This invention relates to magnetic materials and more particularly to permanent magnetic solid solution compositions exhibiting useful magnetic properties.

In the magnetic recording art, binary information is stored in the form of magnetized spots on a recording surface, such as a disc or a drum. Presently, these recording surfaces are prepared by oxidation of metals, such as iron, to form magnetic iron oxides. These oxidation methods are difficult to control, particularly in the degree of oxidation.

What is described herein is a permanent magnetic material having magnetic characteristics particularly suitable for use as a magnetic recording surface. The solid solution comprises mixtures of oxides in which the base compounds have the formulas $LaSrCo_2O_6$ and $$Pb_3WFe_2O_9$$

Within certain compositional limits these compounds form permanent magnetic materials having low Curie temperatures and a high coercitivity. These materials may be conveniently applied in liquid form to a substrate member to form a magnetic recording surface.

Accordingly, an object of the present invention is to provide magnetic materials which have more desirable magnetic properties for use in magnetic record members.

A more specific object of this invention is to provide permanent magnetic materials having high coercive forces which may be conveniently applied to a substrate to form a recording member.

Among the other objects is to provide permanent magnetic materials of solid solutions of $LaSrCo_2O_6$ and $Pb_3WFe_2O_9$.

The foregoing and other objects, features and advantages of the invention will be apparent from the following more particular description of preferred embodiments of the invention.

What has been discovered herein are permanent magnetic materials having new and useful magnetic characteristics. The material is a solid solution of $LaSrCo_2O_6$ and $Pb_3WFe_2O_9$. To prepare these materials, oxides of the metallic constituents of each compound are mixed and calcined at elevated temperatures in an oxidizing atmosphere. A specific example of such processes will be illustrated below. For compositions other than the one given, only the relative proportions of the oxides will vary. Accordingly a solid solution having a ratio $LaSrCo_2O_6$ to $Pb_3WFe_2O_9$ of 1:8 may be prepared by mixing 0.407 gram $La_2O_3$, 0.369 gram $SrCO_3$, 0.398 gram $Co_2O_3$, 13.40 grams PbO, 4.638 grams $WO_3$,3.194 grams $Fe_2O_3$ under ethyl alcohol until homogeneous, calcining at 800° C. in an oxygen atmosphere for 9 hours, regrinding, recalcining at 850° C. in oxygen for 2 hours, pressing into discs, firing at 950° C., cooling at 600° in oxygen and holding at this temperature for about 12 hours and quenched to room temperature. In general all the compositions described herein are prepared in a similar manner. The firing temperature may be between 850–950 and the final controlled oxidation step between 600–700° for all compositions.

Table I below shows compositions in the system which have suitable properties for use as permanent magnetic materials. Compound A is $LaSrCo_2O_6$ and compound B is $Pb_3WFe_2O_9$. While A is othorhombic in structure and B is cubic, the resultant solid solution assumes a pseudo cubic structure. Compositions outside the limits specified have more than one phase and furthermore, have very low magnetic moments.

*Table I*

| Compound A (Moles) | Compound B (Moles) | Curie Temp. Tc, ° C. | Bohr Magnetons $\mu_B$ |
|---|---|---|---|
| 1 | 16 | 440 | * 0.95 |
| 1 | 8 | 500 | * 0.75 |
| 1 | 4 | 500 | * 0.80 |
| 1 | 2 | 450 | * 1.20 |

*Data obtained showing the magnetic moments as a function of temperature and applied field demonstrate that these materials are ferromagnetic.

Referring now to Table II, there is shown the X-ray powder patterns for the solid solution presented in Table I, the numbers given representing the value of $2\theta$ for a cobalt target, the intensity of each line being represented in the usual way.

*Table II*

| 1—2 | 1—4 | 1—8 | 1—16 |
|---|---|---|---|
| 90.4 (m−) | 90.5 (m−) | 90.7 (m−) | 90.8 (m−) |
| 78.7 (m−) | 78.8 (m−) | 79.1 (m−) | 79.1 (m−) |
| 66.6 (m) | 66.7 (m) | 66.9 (m) | 66.9 (m) |
| 53.2 (m) | 53.4 (m) | 53.5 (w) | 53.6 (w) |
| 45.8 (w) | 45.8 (w) | 45.9 (w) | 45.9 (w) |
| 36.9 (v.s.) | 37.0 (v.s.) | 37.1 (v.s.) | 37.0 (v.s.) |
| 20.4 (w) | 22.4 (w) | 26.0 (w) | 26.0 (w) |

While solid solutions of the base compound and properties are shown certain substitutions may be made into the base compounds with equivalent results. For example, Co may be substituted for Fe in the $Pb_3WFe_2O_9$ base system in the same proportions to provide similar solid solutions as with the base compounds themselves.

Magnetic material of the present invention finds particular usefulness as a high density storage material. For this application the solid solution material is melted at about 850–1000° and applied in liquid form to a substrate member, as for example silica or alumina. The coercive forces of the resulting recording surface is about 350 oersteds, which provides high output signal in operation of the device.

While the invention has been particularly shown and described with reference to preferred embodiments thereof, it will be understood by those skilled in the art that various changes in form and details may be made therein without departing from the spirit and scope of the invention.

I claim:

1. Permanent magnetic material comprising a solid solution of $LaSrCo_2O_6$ (A) and $Pb_3WFe_2O_9$ (B) wherein the A:B ratio is between 1:2 and 1:16.

2. The magnetic material according to claim 1 wherein the A:B ratio is 1:8.

3. The magnetic material according to claim 1 wherein the A:B ratio is 1:2.

4. A permanent magnetic material comprising a solid solution of $LaSrCo_2O_6$ (A) and $Pb_3WFe_2O_9$ (B) in the ratio A:B of 1:16 said material having a Curie temperature of 440° C., a magnetic moment of 0.95 Bohr magneton.

5. A method of making a permanent magnetic material of solid solutions of $LaSrCo_2O_6$ (A) and $Pb_3WFe_2O_9$ (B) having the ratio A:B of 1:2 to 1:16 which comprises mixing oxides of the metals in predetermined proportions, calcining in an oxidizing atmosphere between 850–950° C., cooling in an oxidizing atmosphere to between 600–700° and quenching to room temperature.

6. The method according to claim 5 wherein the composition ratio A:B is 1:8, the firing temperature is 950° and the cooling temperature is 600°.

7. A method of making a permanent magnetic material having a Curie temperature of 500° C., a magnetic memory of 0.5 Bohr magneton, an X-ray diffraction pattern, 2θ using a cobalt target of 90.7 (m−), 79.1 (m−), 66.9 (m), 53.5 (w), 45.9 (w), 37.1 (v.s), 26.0 (w), which comprises the steps of mixing 0.407 gram $La_2O_3$, 0.369 gram $SrCO_3$, 0.398 gram $Co_2O_3$, 13.40 grams PbO, 4.638 grams $WO_3$, and 3.194 grams $Fe_2O_3$ under ethyl alcohol until the mixture is homogeneous, calcining at 800° C. in an oxygen atmosphere for 9 hours, regrinding, recalcining at 850° in oxygen for 2 hours, pressing into discs, firing at 950° C., cooling at 600° in oxygen, holding at the latter temperature for about 12 hours, and quenching to room temperature.

8. Permanent magnetic material comprising a solid solution of $LaSrCo_2O_6$ (A) and a member (B) selected from the group consisting of $Pb_3WFe_2O_9$ and $Pb_3WCo_2O_9$ within the limits of A:B of 1:2 to 1:16.

References Cited in the file of this patent

UNITED STATES PATENTS

| | | |
|---|---|---|
| 2,677,663 | Jonker et al. | May 4, 1954 |
| 2,807,586 | Moran | Sept. 24, 1957 |
| 2,837,483 | Hakker et al. | June 3, 1958 |
| 2,900,344 | Stuyts et al. | Aug. 18, 1959 |

FOREIGN PATENTS

| | | |
|---|---|---|
| 752,659 | Great Britain | July 11, 1956 |